United States Patent
Fistler et al.

(10) Patent No.: US 7,509,964 B2
(45) Date of Patent: Mar. 31, 2009

(54) AUTOMOTIVE GLASS WASHER ARRANGEMENT

(75) Inventors: James D. Fistler, Macomb Township, MI (US); Thomas W. Cox, Lapeer, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 564 days.

(21) Appl. No.: 11/369,808

(22) Filed: Mar. 7, 2006

(65) Prior Publication Data

US 2007/0209687 A1   Sep. 13, 2007

(51) Int. Cl.
*B08B 3/00* (2006.01)
(52) U.S. Cl. .......................... 134/123; 134/45; 134/109
(58) Field of Classification Search ............ 134/45, 134/104.4, 109, 110, 123, 131, 133, 166 R, 134/169 A, 198; 239/284.1, 284.2; 285/305, 285/319
See application file for complete search history.

(56) References Cited

U.S. PATENT DOCUMENTS

| | | | | |
|---|---|---|---|---|
| 4,796,856 A | * | 1/1989 | Munini | .................... 251/149.5 |
| 5,762,671 A | * | 6/1998 | Farrow et al. | .................. 55/496 |
| 6,398,134 B1 | * | 6/2002 | Hickson et al. | ............. 239/394 |
| 2004/0188541 A1 | | 9/2004 | Maruyama | |
| 2005/0076664 A1 | * | 4/2005 | Sylvia | .......................... 62/304 |
| 2005/0093297 A1 | * | 5/2005 | Gilpatrick et al. | ........... 285/316 |

FOREIGN PATENT DOCUMENTS

| | | |
|---|---|---|
| DE | 7402416 U1 | 1/1974 |
| DE | 3446772 A1 | 7/1986 |
| DE | 4434800 A1 | 4/1996 |
| DE | 29712490 U1 | 10/1997 |
| DE | 10063285 A1 | 6/2002 |

* cited by examiner

*Primary Examiner*—Michael Barr
*Assistant Examiner*—Rita R Patel

(57) ABSTRACT

An automotive glass washer arrangement includes a washer pump having an outlet in fluid connection with at least one automotive glass washer nozzle. The arrangement comprises a fluid coupling having a female element with a chamber therein. A replaceable filter is disposed in the chamber. The fluid coupling further has a male element connected to the female element wherein the female element is in fluid communication with the washer pump and the male element is in fluid communication with the at least one nozzle. In a preferred embodiment, the female element is connected to the washer pump with a first hose and the male element is connected to the washer nozzle with a second hose.

16 Claims, 4 Drawing Sheets

AUTOMOTIVE GLASS WASHER ARRANGEMENT

FIELD OF THE INVENTION

The present invention relates to automotive glass washer arrangements. More particularly, the present invention relates to such arrangements wherein the arrangements include a filter.

BACKGROUND OF THE INVENTION

In designing windshield washer systems it is desirable to enhance reliability. Moreover, there is a need to decrease expense by reducing both labor costs and component costs, as well as a need to reduce packaging space within vehicles.

Automotive glass washer arrangements include reservoir, a washer pump and at least one nozzle for spraying the washer fluid onto the glass. Typically, a windshield washer uses a pair of nozzles to spray the windshield and a rear window washer uses a single nozzle, which may have a pair of outlets. To prevent blockage of washer nozzles with particulate materials, current arrangements use filters disposed upstream of washer pump impellers. These filters do not filter out possible impeller material. Moreover, during initial start-up, priming difficulties are a possibility because filters upstream of the impeller create surface tension that may interfere with fluid entering pump inlets.

While addressing the aforementioned concerns, there is a need to make fluid connections ergonomically friendly during initial assembly and subsequent servicing. In addition, it is desirable to limit the number of fluid connections, while lowering component costs.

SUMMARY OF THE INVENTION

An automotive glass washer arrangement includes a washer pump having an outlet in fluid connection with at least one automotive glass washer nozzle wherein a filter is disposed between the washer pump and nozzle. Preferably, the filter is in a fluid coupling having an upstream portion in fluid connection with the outlet of the washer pump and a downstream portion in fluid connection with the nozzle. Alternatively, there are at least two nozzles.

In the aforedescribed arrangement, the upstream portion of the coupling has a hollow body in which the filter is received and the downstream portion has a filter bypass so that the washer nozzle receives pumped washer liquid even when the filter is clogged.

In a preferred embodiment of the arrangement the downstream portion of the fluid coupling is a male element and the upstream portion is a female element with the filter being a replacement filter cartridge in the female element. Alternatively, a replacement cartridge is in the male element and the downstream element is female.

It is preferred that the fluid coupling is connected to the washer pump with an upstream fluid line and connected to the at least one nozzle with a downstream fluid line.

In a further aspect of an automotive glass washer arrangement according to the invention, a washer pump has an outlet in fluid connection with at least one automotive glass washer nozzle and a fluid coupling has a female element having a chamber with a filter therein. The fluid coupling further has a male element connected to the female element, wherein the female element is in fluid communication with the washer pump and the male element is in fluid communication with the at least one nozzle. Alternatively, there are at least two automotive glass washers for windshield applications.

In the aforedescribed arrangement the female and male elements are molded elements with the chamber of the female element receiving a head portion of the male element and sealing with the male element. Preferably, a shoulder around the female portion is in latching relationship with resilient detent portions of the male element, although alternative filter retention arrangements may include but are limited to welding and molding.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
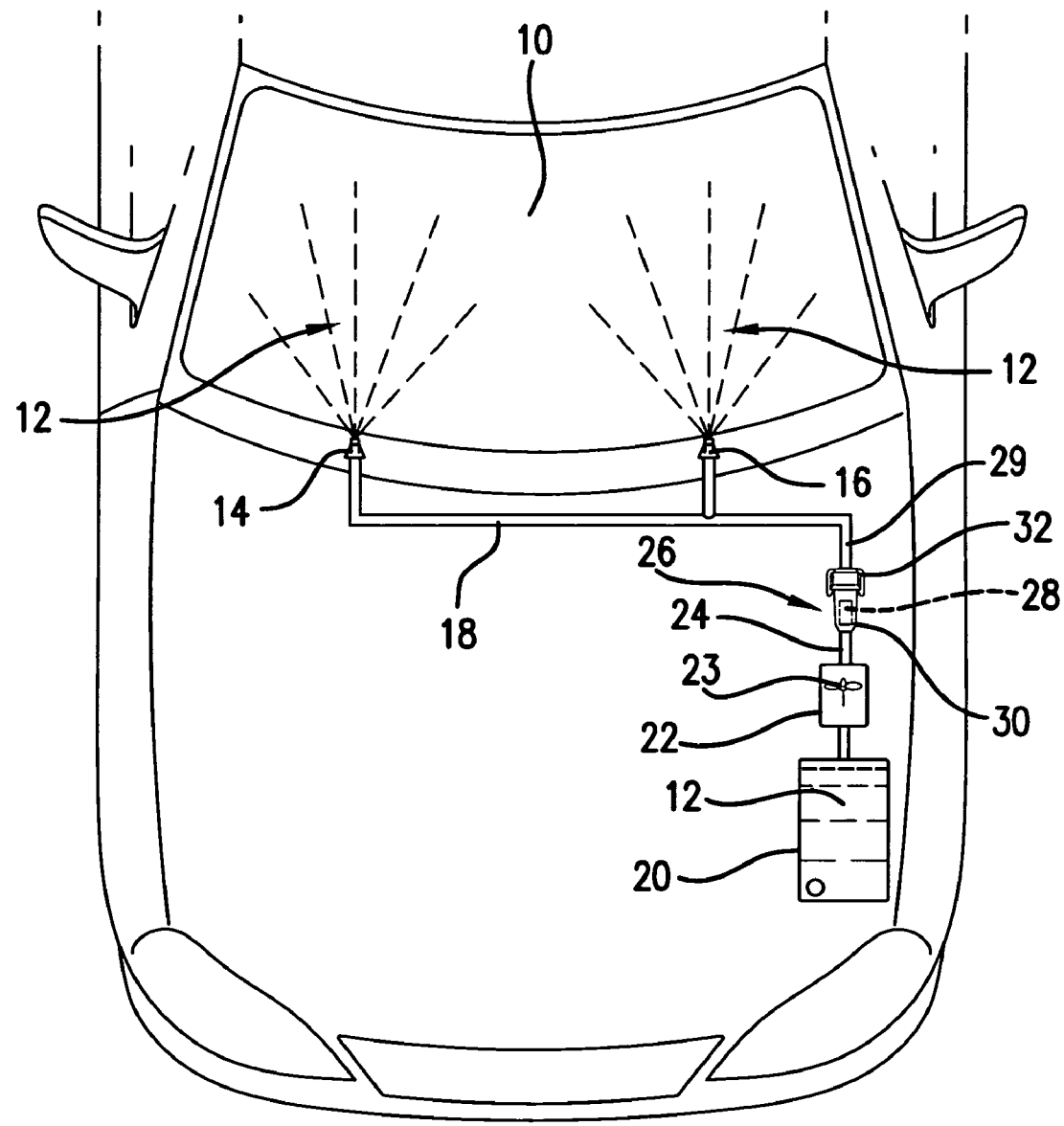
FIG. 1 is a schematic view of an automotive glass washer arrangement configured in accordance with the principles of the present invention.

Referring now to FIG. 1, automotive glass such as a windshield 10 is washed by washer liquid 12 dispensed onto the glass by a pair of nozzles 14 and 16. The nozzles 14 and 16 are connected in series to one another by a fluid line 18 that is in turn supplied with washer fluid from a reservoir 20. The reservoir 20 is connected to a washer pump 22 that uses an impeller 23 to pump the washer liquid 12 through a first fluid line in the form of a first hose 24 to a fluid coupling 26, configured in accordance with principles of the present invention. The fluid coupling 26 includes a filter 28 for removing debris, including debris from the impeller 23, which has been passed from the washer pump 22 to the hose 24. The filter 28 is preferably cylindrical and is preferably made of plastic or stainless steel. A second fluid line in the form of a second hose 29 delivers filtered washer fluid 12 to the fluid line 18 connected to the nozzles 14 and 16.

Figure 2:
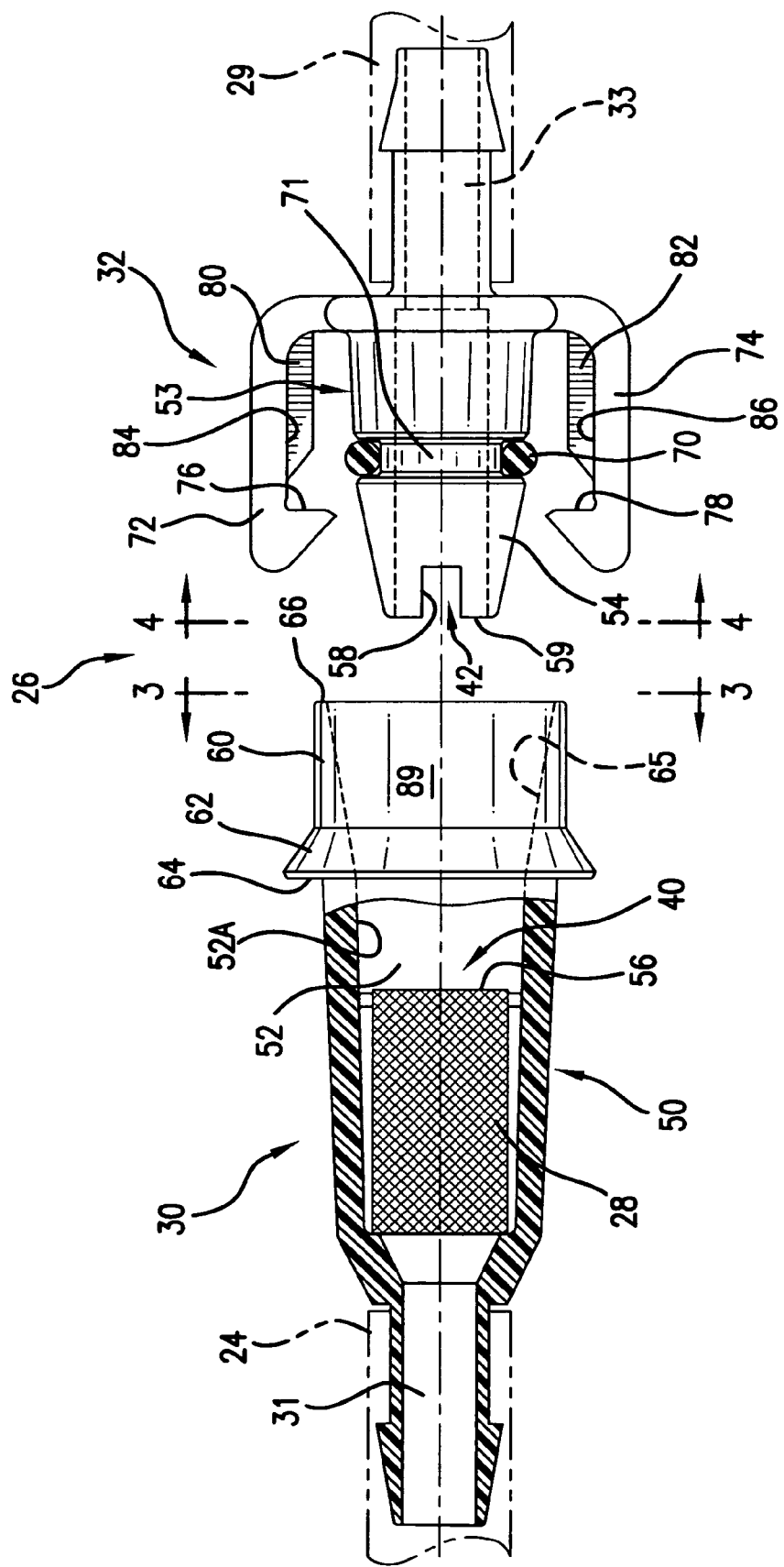
FIG. 2 is a side view, partially in phantom, showing a fluid coupling of the present invention prior to connection.

Referring now to FIG. 2, in accordance with the present invention, the coupling 26 has an upstream element 30 with a bore 31, and a downstream element 32 having a bore 33, the filter 28 being removable and replaceable by opening the coupling 26, or by replacing the element having the filter integral therewith. In FIG. 2, the upstream element 30 and the downstream element 32 of the coupling 26 are shown either prior to engagement or subsequently disengaged. Preferably, the upstream element 30 is a female element 50 and the downstream element 32 is a male element 53 with the filter 28 disposed in a chamber 40 of the upstream element 30. If the filter 28 becomes clogged, the downstream element 32 has a filter bypass (dotted lines) 42 that allows washing fluid 12 to flow into and through the bore 33 in the downstream element 32 of the coupling 26.

Further with respect to FIG. 2, in a preferred embodiment, the upstream element 30 of the coupling 26 is an illustrated female element 50 having the filter 28 integral therewith in the chamber 40. A frustoconical space 52 is positioned downstream of the filter 28 to receive part of the downstream element 32 of the coupling 26. The downstream element 32 is an illustrated male element 53 having a frustoconical head 54 which is inserted into the frustoconical space 52 to face the upstream end 56 of the filter 28 when the male element 53 is connected to the female element 50. To provide the filter bypass 42, the head 54 has a filter bypass channel 58 extending radially through the end 59 of the head. The filter bypass channel 58 communicates with the bore 33 through the male element 53.

Figure 3:
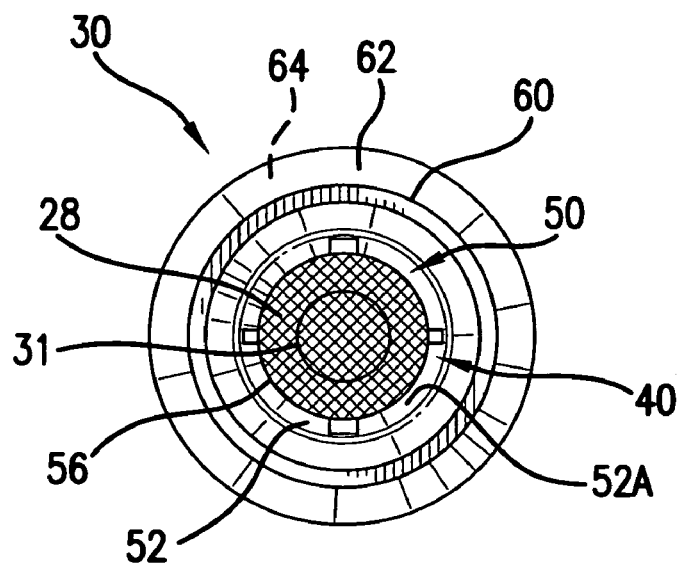
FIG. 3 is an end view of a female element of the coupling without the filter, taken along lines 3-3 of FIG. 2.
Figure 4:
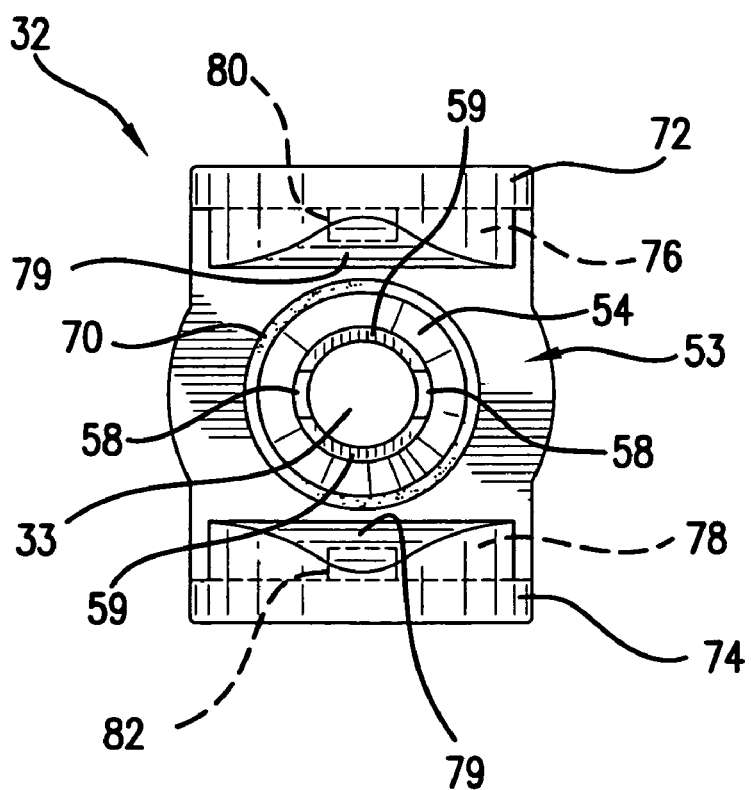
FIG. 4 is an end view of a male element of the fluid coupling taken along lines 4-4 of FIG. 2.

As is seen in FIGS. 3 and 4 in combination with FIG. 2, the female element 50 is annular and includes an annular end portion 60 having a ramp 62 thereon which terminates in a radial shoulder 64. As is seen in FIGS. 2 and 4, the male element 53 has a resilient O-ring 70 thereon positioned in an annular groove 71 upstream of the frustoconical head 54. The resilient O-ring 70 seals against the wall 52A of the frustoconical space 52 in the female element 50. First and second resilient detent arms 72 and 74 extending from the male element 53 have shoulders 76 and 78, respectively, which are engageable behind the shoulder 64 of the female element 50. As is seen in FIG. 4, the shoulders 76 and 78 of the detent arms 72 and 74 on the male element 53 have V-shaped convex ends 79. The detent arms 72 and 74 have ribs 80 and 82, respectively, extending longitudinally on inner surfaces 84 and 86 to stiffen the detent arms.

Figure 5:
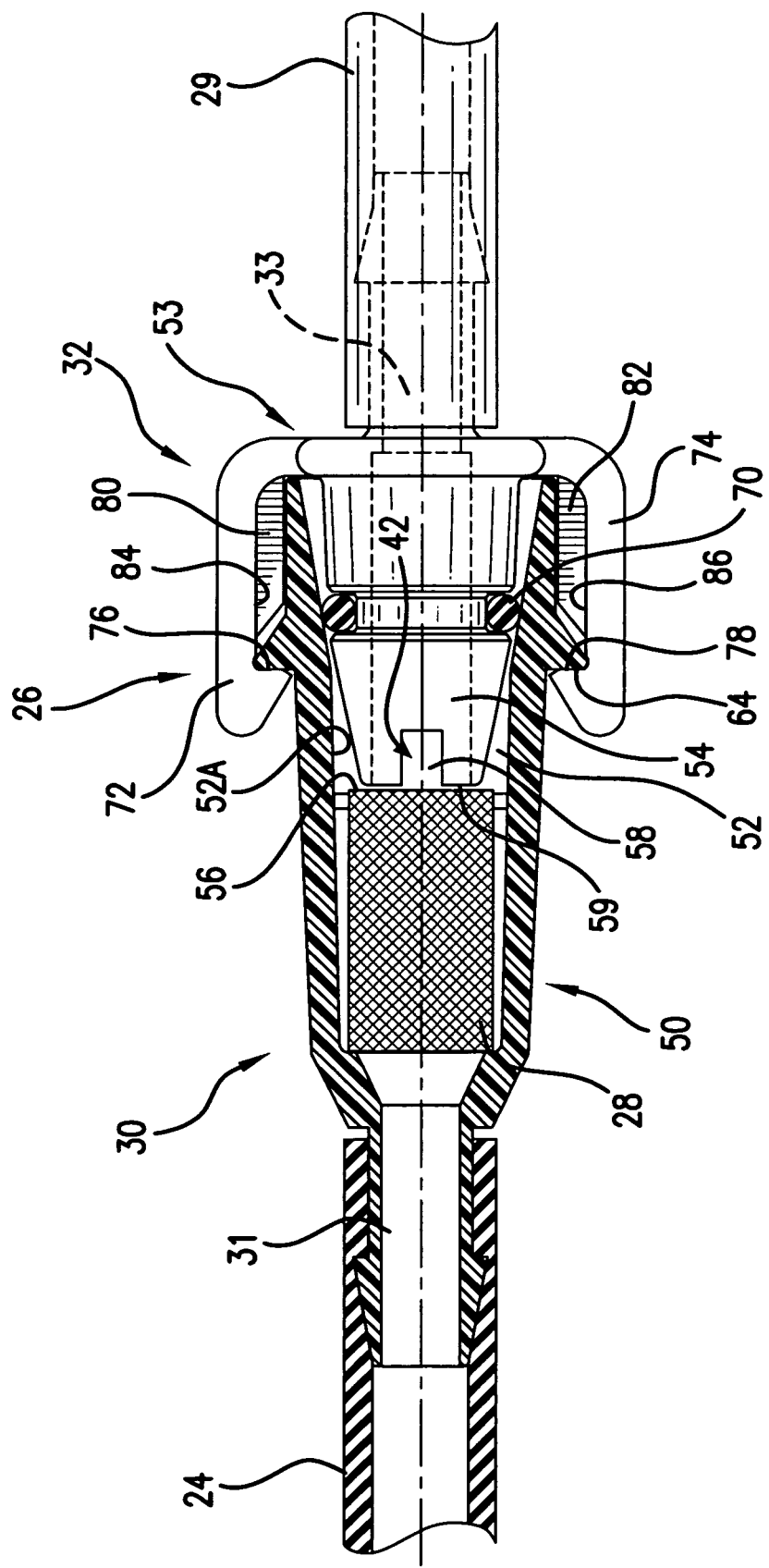
FIG. 5 is a side view, partially in elevation, showing the female and male elements of the coupling of FIGS. 2-5 joined with one another.

Referring now to FIG. 5, it is seen that when the female element 50 and male element 53 are coupled, the wall 52A in the female element is in sealed relationship with the resilient O-ring 70 on the male element 53, with the head 54 of the male element 53 in spaced relation with the upstream end 56 of the cylindrical filter 26. While the resilient ring 70 seals with the frustoconical inner wall surface 52A, latching engagement of the shoulders 76 and 78 on the detent arms 72 and 74 with the shoulder 64 on the annular end portion 60 of the female element 50 positively retains the female and male elements 50 and 53 together. If the filter 28 becomes clogged, then as previously stated, the bypass channel 58 of the head 54 allows the washing liquid 12 to bypass the filter 28 and flow through the bore 33 in the male element 53. This is facilitated by the filter 28 moving slightly downstream under the pressure of the washer fluid 12 to close the gap between the filter 28 and the end 59 of the head 54. Since the surface 52A is slightly conical, the washer fluid 12 then flows past the filter 28 and into the space 52 so that it can flow out through the bypass channel 58 and into the bore 33. The coupling 26 is opened after disengaging the shoulders 76 and 78 from the shoulder 64 by spreading the resilient detent arms 72 and 74 to unlatch the male element 53 from the female element 50 and then sliding the male element 53 out of the female element 50.

In one embodiment of the invention, the filter 28 is integral and fixed in the chamber 40 so that the entire female element 50 may be replaced when the filter is clogged. In another embodiment, the filter 28 is loosely mounted so that only the filter is replaced when clogged.

In the illustrated embodiment of FIG. 2, the coupling 26 and filter 28 are disposed between the first fluid hose 28 and second fluid hose 29 which are connected to the female and male elements 50 and 53 by hose connectors 90 and 92, respectively. In another embodiment, the coupling 28 and the filter 26 may be attached directly to the outlet of the washer pump 22 at a location downstream of the impeller 23. In still another embodiment, the coupling 28 may be placed adjacent to the washer nozzle 14 and the second fluid hose 29 dispensed with. In each of these embodiments, the filter 26 is downstream of the washer pump 22 so as not to interfere with priming of the washer pump and to trap debris which might dislodge from the impeller 33. However, it is preferable to use the embodiment of FIGS. 2-5 in which the flexible hoses 24 and 29 are used so that the coupling 26 containing the filter 28 may be ergonomically joined during vehicle assembly and, if the filter needs replacement, ergonomically serviced thereafter.

From the foregoing description, one skilled in the art can easily ascertain the essential characteristics of this invention, and without departing form the spirit and scope thereof, can make various changes and modifications of the invention to adapt it to various usages and conditions.

We claim:

1. An automotive glass washer arrangement including a washer pump having an outlet in fluid connection with at least one automotive glass washer nozzle, the arrangement comprising:
   a fluid coupling having an upstream portion in fluid connection with the outlet of the washer pump and a downstream portion in fluid connection with the at least one nozzle, and
   a filter disposed in the coupling for removing debris from liquid in a first fluid line fluidly connected to the washer pump;
   wherein the downstream portion includes a filter bypass channel for permitting the flow of liquid through the fluid coupling when the filter is clogged, the filter bypass channel extending radially through an end of the downstream portion wherein the upstream portion of the coupling has a hollow body in which the filter is received; and wherein the filter is configured to move slightly downstream under the pressure of washer fluid when the filter is clogged, thereby facilitating flow through the bypass channel.

2. The arrangement of claim 1 wherein the downstream portion of the fluid coupling is a male element and the upstream portion is a female element.

3. The arrangement of claim 2 wherein the filter is a filter cartridge.

4. The arrangement of claim 3 wherein the cartridge is a cylinder cartridge received by the female element; and
   wherein the female element is annular and includes a slightly conical shaped inner wall surface.

5. The arrangement of claim 4 wherein the fluid coupling is connected to at least the washer pump with an upstream fluid line.

6. The arrangement of claim 4 wherein the fluid coupling is connected to the at least one nozzle with a downstream fluid line.

7. The arrangement of claim 4 wherein the fluid coupling is connected to the washer pump with the first fluid line and connected to the at least one nozzle with a second fluid line.

8. The arrangement of claim 4 wherein the female element has a hose connector projecting from the upstream portion thereof that is connected to the first fluid line and the male element has a hose connector projecting from the downstream portion thereof that is connected to a second fluid line; and
   wherein the second fluid line is fluidly connected to the at least one washer nozzle.

9. The arrangement of claim 8 wherein the male element is a molded element having a resilient portion latching with the female element.

10. The arrangement of claim 9 wherein the female element is a molded element having a shoulder engaged by the resilient portion of the male element.

11. The arrangement of claim 1 wherein there are two washer nozzles fluidly connected to one another by a second fluid line.

12. An automotive glass washer arrangement including a washer pump having an outlet in fluid connection with at least one automotive glass washer nozzle, the arrangement comprising:

a fluid coupling having a female element with a chamber therein, the chamber having a replaceable filter therein; the fluid coupling further having a male element connected to the female element wherein the female element is in fluid communication with the washer pump and the male element is in fluid communication with the at least one nozzle;

wherein a head portion of the male element includes a filter bypass channel therein, the filter bypass channel extending radially through an end of the head portion for permitting the flow of fluid through the fluid coupling when the filter is clogged wherein the female element is annular and includes a slightly conical shaped inner wall surface; and wherein the filter is configured to move slightly downstream under the pressure of the washer fluid when the filter is plugged, thereby facilitating flow through the bypass channel.

13. The arrangement of claim 12 wherein the female element is connected to the washer pump via a first fluid line, and the male element is connected to the at least one nozzle via a second fluid line.

14. The arrangement of claim 13 wherein there are two nozzles.

15. The arrangement of claim 14 wherein the female and male elements are molded elements with the chamber of the female element receiving the head portion of the male element for engagement with the filter and with a shoulder around the female element being in latching relationship with resilient detent arms of the male element.

16. The arrangement of claim 15 wherein the resilient detent arms on the male element are in radial spaced relation to the head portion of the male element.

* * * * *